Dec. 27, 1932.    H. C. HAYES    1,892,147
VIBRATION DETECTOR
Filed Sept. 23, 1927    4 Sheets-Sheet 1
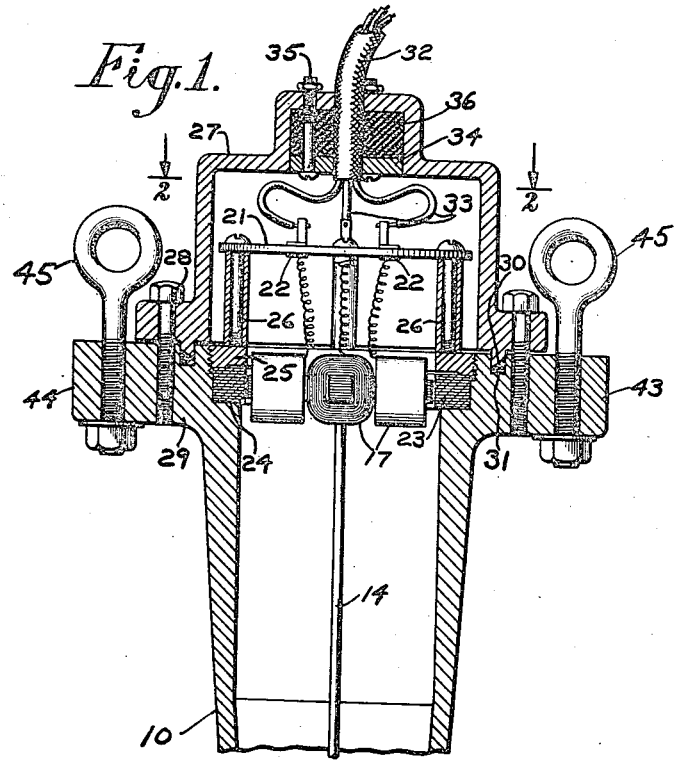
Fig.1.
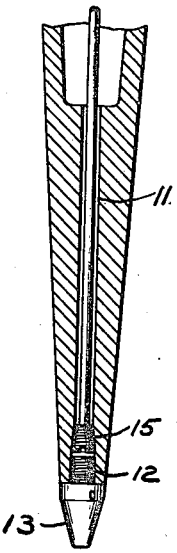
Inventor
Harvey C. Hayes
By Attorney
Harold Todd.

Dec. 27, 1932.  H. C. HAYES  1,892,147
VIBRATION DETECTOR
Filed Sept. 23, 1927     4 Sheets-Sheet 2

Inventor
Harvey C. Hayes
By Attorney
Harold Dodd.

Dec. 27, 1932.  H. C. HAYES  1,892,147
VIBRATION DETECTOR
Filed Sept. 23, 1927   4 Sheets-Sheet 3
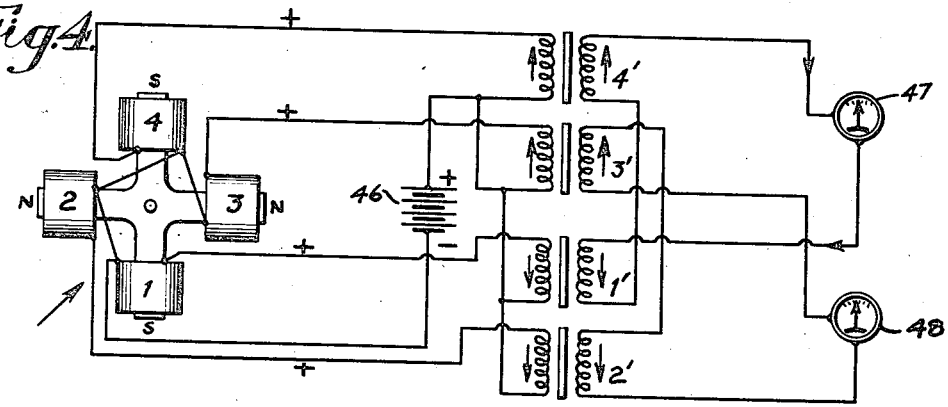
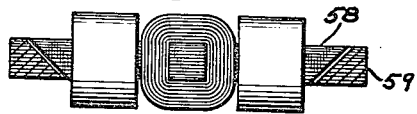
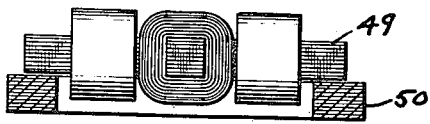
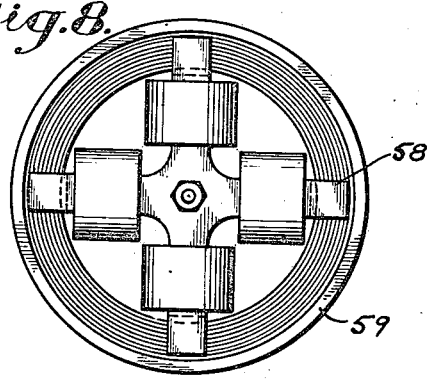
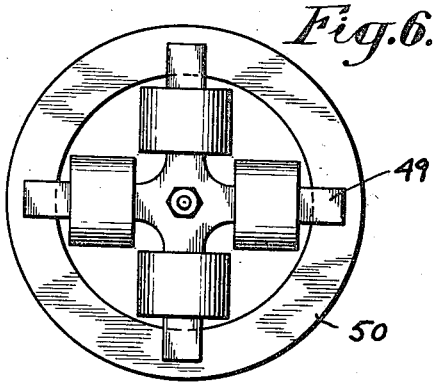
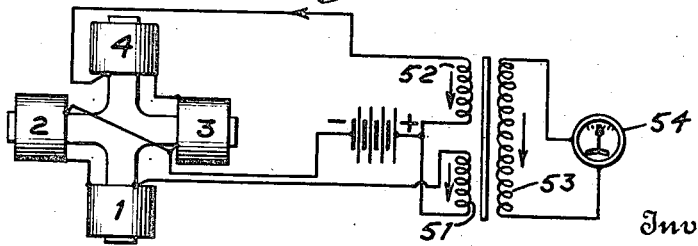
Inventor
Harvey C. Hayes
By Attorney
Harold Dodd.

Dec. 27, 1932.   H. C. HAYES   1,892,147
VIBRATION DETECTOR
Filed Sept. 23, 1927   4 Sheets-Sheet 4

Inventor
Harvey C. Hayes
By Attorney

Patented Dec. 27, 1932

1,892,147

UNITED STATES PATENT OFFICE

HARVEY C. HAYES, OF WASHINGTON, DISTRICT OF COLUMBIA

VIBRATION DETECTOR

Application filed September 23, 1927. Serial No. 221,520.

(GRANTED UNDER THE ACT OF MARCH 3, 1883, AS AMENDED APRIL 30, 1928; 370 O. G. 757)

It has been a primary object of the present invention to devise means for detecting vibrations which are produced in the surface of the earth either in the form of sound waves or of waves having a frequency outside of the range of audibility. An important feature of the present invention is the construction of a device which is capable of picking up vibrations with equal facility over a wide range of direction. This is quite important where the precise direction from which the vibration emanates is not known and where it is desired to take note of the magnitude of the vibrations received.

While the device contemplated by the present invention is not limited to use in solid ground, but can be used for the reception of sound waves through water or directly through the air, it is particularly well suited for the reception of earth tremors and the like. One instance of the use to which the detector of the present invention can be put is for the reception of waves artificially set up in the ground, as by the explosion of a charge of dynamite, so that the character of the waves may be readily studied. It is well known that the amplitude and other characteristics of waves of this type vary materially with the nature of the media through which they have travelled and also in accordance with whether they are directly received or received after refraction or reflection.

An object of the invention has been to construct a device for the purposes specified in such a way that the mechanical energy of the sound or similar wave may readily be converted into electrical energy. This conversion, furthermore, has been brought about without sacrificing any of the inherent characteristics of the original wave so that the records produced by the electrical means will give an accurate indication of the nature of the original waves.

It has been an object to provide a very intimate contact between the device and the earth whose vibrations it is designed to detect. For this purpose the outer casing of the instrument has been formed in the shape of a cone having a gradual taper and being of sufficient dimension to insure its movement with the earth. To aid in providing this movement with the earth, furthermore, the casing has been constructed of suitable material and of appropriate thickness so that the device will have substantially the same average density and the same center of gravity as the earth into which it is inserted.

In the operation of the device which is based upon the general principles of magneto-electrical devices the casing is adapted to partake of the vibrations to be recorded while an inertia member within the casing remains substantially stationary. This provides the necessary relative movement between certain magnetic poles and adjacent magnetic conductors to create the desired variations in the flux passing through suitable coils located in the magnetic field. It is an object to so arrange the magnets and coils that the effects will be combined and will be substantially uniform over a wide range of direction of reception.

Another object of the invention has been to so construct and arrange the armature and its coils that a single device may, if desired, be employed not only to detect and give an indication of magnitude of the vibration but may at the same time indicate the direction of the source of the vibration.

The invention also contemplates various modifications whereby it is possible to detect vibrations or waves arriving at the instrument from a vertical direction or whereby the device may be made to detect both horizontal and vertical vibrations, or such components of waves coming from any direction between the horizontal and vertical planes.

With these and other incidental objects in view one form of the invention will now be described with reference to the accompanying drawings which form a part hereof and in which Figure 1 is a cross sectional view in elevation of the assembled vibration detector.

Figure 2 is a sectional view along the line 2—2 of Figure 1 with certain parts broken away to disclose others.

Figure 3 is a diagrammatic view of the circuits employed in the use of the device.

Figure 4 is a diagrammatic showing of suitable circuits for enabling the detector to determine the direction of the source of the vibration.

Figure 5 is a vertical section through the armature and cooperating laminated ring of a modified form of the invention adapted to detect vertical components of a vibration.

Figure 6 is a plan view of the parts shown in Figure 5.

Figure 7 is a vertical section through the armature and laminated ring of a further modification adapted to detect both horizontal and vertical components of a vibration.

Figure 8 is a plan view of the parts shown in Figure 7.

Figure 9 is a diagram showing a suitable arrangement of circuits adapted to detect only vertical components.

Figure 10:
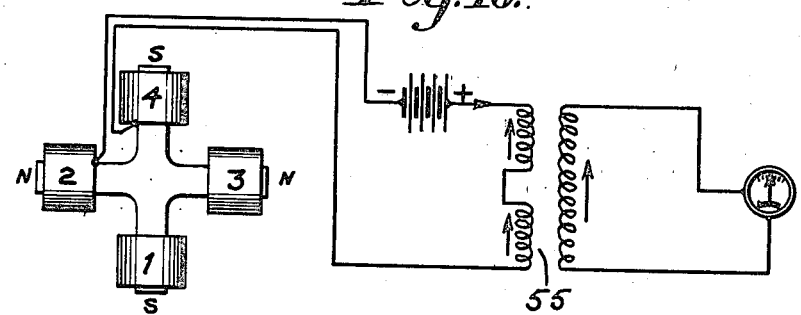
Figures 10 and 11 are diagrams of other circuits having the coils in series and in parallel, respectively, and adapted only to detect vertical components.

Referring now to Figure 1 it will be noted that the main body of the device is formed by a conical casing 10 of any suitable material, preferably such that with other parts, as will be explained, it will create a mass having an average density substantially the same as that normally encountered in surface soil. Aluminum has been found very satisfactory for this purpose. In practice it has been found desirable to make this casing of considerable length, approximately 30 inches over all, and the average thickness of the wall is preferably between ¼ and ½ inch. For a distance of a few inches from the lower tip of the cone it is substantially solid, except for an opening 11 which is drilled through this lower portion. Above the substantially solid part there is a large cavity or opening practically in the form of a frustrum of a cone which leaves only a wall of the desired thickness, such as mentioned. The cone preferably tapers from a relatively sharp point to an outside diameter in the neighborhood of five inches while the opening is approximately three inches in diameter at the top.

In order to facilitate the insertion of the cone into the earth it is provided with a steel point 13 having a screw threaded extension 12 adapted to be fitted into a screw threaded opening at the lower end of the conical casing. The outer surface of the tip as shown is designed to form a smooth even contour with the lower end of the casing. If desired the tip may be locked into position when screwed into place by means of a countersunk set screw extending through the lower wall of the casing.

A resilient rod 14 of sufficient length to have a low natural frequency of vibration and made of any suitable material, preferably brass, carries a screw threaded tip 15 which is also adapted to fit into a threaded portion at the lower end of the conical casing. The rod extends upwardly through the opening 11 and into the larger cavity of the cone to a point substantially at or near the upper surface of the cone. This rod is adapted to support an armature 16 which, as shown, is preferably formed as a cross to provide four separate pole pieces. The armature, which is preferably made of laminated steel such as is commonly used in transformers, may be secured in any way to the end of the rod, as by fitting it over the end of the rod onto a shoulder formed thereon and by holding it in place by a nut as shown. On each of the four poles of the armature there is mounted a coil 17 formed of a suitable number of turns of insulated wire, these coils being designated as 1, 2, 3 and 4 in Figure 3 of the drawings. The turns or windings of the coils are arranged in such sense about the armature poles that current passed through them from a D. C. source will tend to establish like magnetic poles at opposite ends of the cross, for example coils 1 and 4 may establish south poles, while coils 2 and 3 may establish north poles. Suitable connecting wires are employed to couple the coils, as shown in Figure 3. Thus coils 1 and 2 are connected in series by means of their outermost turns, while coils 3 and 4 are similarly connected. The inner ends of coils 2 and 3 are connected and suitable leads are taken off from the loose ends of coils 1 and 4 and from the inner end of the coil 2, these leads being designated 18, 19 and 20, respectively. Insulating plate 21 made of any suitable material, such as a phenolic condensation product, carries a set of three contact points 22 to which the several leads 18, 19 and 20 are connected.

Surrounding the armature there is provided an annular ring 23 made up of laminations similar to those employed in the armature itself. These may or may not be bound together, as desired, since they are squeezed tightly together by means of a locking ring 25 which forces them against a shoulder 24 at the upper end of the conical casing. The locking ring which is screw threaded into the upper end of the casing is preferably made of some non-magnetic material, such as brass. It is quite essential that considerable accuracy be provided in the fitting of the armature within the annular ring. For this reason the inside of the ring is preferably ground accurately to the desired diameter and similarly the ends of the pole pieces are ground to form an accurate, arcuate face. Normally there will be a slight clearance between the ends of the pole pieces and the inner surface of the annular ring. In practice it has been found desirable to provide a clearance of about .006 of an inch between each pole piece and the ring. A series of screws 26 pass through collars of appropriate length which serve to support the previously mentioned plate 21, the lower ends of these screws being fitted into threaded openings in the ring 25.

A cap 27, preferably formed of aluminum, is adapted to enclose the elements located at the upper end of the cone and is secured to the latter. For this purpose the cap is provided with a flange through which a series of bolts 28 pass into a corresponding flange 29 of the cone. An annular rib 30 formed on the lower surface of the cap and having its lower edge cut at an angle, as shown, is adapted to fit into an annular recess 31 in the upper end of the cone to provide a water-tight seal at this point. As an aid to the effectiveness of this seal the annular recess is preferably filled with some yielding material, such as rubber, to form a gasket. A small opening in the upper end of the cap is adapted to permit the passage of the cable 32 having three leads 33 which are connected to the contact points 22. In order to provide a water-tight connection surrounding the cable the latter fits as tightly as possible in the opening in the cap and there is also provided a stuffing box or gland construction in the upper portion of the cap. Thus a small reduced portion of the latter is closed off by a disk 34 which is supported from the top of the cap by a series of three bolts 35. The chamber thus provided may be filled with any suitable material, such as rubber.

In practice the device if used in solid ground must be inserted into the earth for the full length of the cone, which, as previously stated, may be about thirty inches. Since it would probably damage the instrument to attempt to force it directly into any very solid ground it is contemplated that conical holes of substantially the right dimensions may first be formed by means of a prod bar, for example, so that the detector need only be forced for the last few inches of its length. In so forming the device it has been found to establish a very intimate contact with the surrounding soil whereby any vibration of the latter, in its packed condition, will be readily transmitted to the casing. The armature 16, however, due to its inertia will tend to remain stationary on the upper end of the rod 14 thereby tending to decrease the air gap between certain of the poles and the annular ring 23 and at the same time increase the air gap between one or more of the remaining poles and the ring. This variation in the air gaps will, of course, tend to vary the flux passing through the several coils and will tend to induce an E. M. F. in each of them.

In Figure 3 there is shown diagrammatically the connections which have been found most satisfactory in the use of the detector for the reception of earth vibrations. In this view 37 designates a D. C. source of current which is connected in parallel with the two pairs of coils, namely, 1 and 2 in one branch of the circuit and 3 and 4 in the other branch. The circuit through the coils 1 and 2 may be returned through the section 38 of the primary winding of a transformer, while the circuit through the coils 3 and 4 may be returned through a section 39 of the same primary winding. When the apparatus is at rest the current flowing through the coils and through the sections of the transformer will be constant so that no current will be induced in the secondary winding 40 of the transformer. However, when a relative movement is produced between the armature and the annular ring, for example in the direction indicated by the arrow, the flux through coils 1 and 2 will be decreased due to the enlargement of the air gap and a current will, therefore, be induced in these coils which will be in the same sense as the current from the source 37. This added current may pass through the coil 38 in the direction indicated by the arrow 41. At the same time the flux through the coils 3 and 4 will be increased and a current opposing that supplied by the source 37 will be induced and this current, therefore, or change in current will have the general direction in coil 39, as indicated by the arrow 42. Thus it will be seen that the two induced currents in the coils 1 and 2 and the coils 3 and 4, respectively, will be added in their effect in passing through the primary of the transformer, so that a current equal to the combined effect will be induced in the secondary winding 40. Any suitable means may be provided for creating a visible or audible indication of the current changes in the transformer.

A feature to be noted in connection with the generation of the induced current in the manner specified is that the precise direction from which the vibration is received is not material, the magnitude of the effect produced in the transformer will be substantially the same for a given magnitude of vibration over a wide range of direction from which it may be received. This is brought about by the fact that the currents induced in each coil of a pair will be added to the current induced in the other coil of the pair. Considering the coils 1 and 2, for example, a vibration received in a horizontal direction, as shown, will induce a maximum current in coil 2 and practically no current in coil 1. On the other hand a movement in the vertical direction, as shown, will induce a maximum current in coil 1 and little or no current in coil 2. If the vibration is received from any intermediate direction within the 90° range between the horizontal and vertical it will generate a current in both coils corresponding to the horizontal and vertical components of the motion and the two currents in the coils 1 and 2 will be added. There is only a single definite direction from which a vibration will have no effect upon the transformer. This is a vibration substantially at right angles to the arrow shown in Figure 3. It will be seen that a vibration in this direction, say toward the upper left hand corner of the drawings, will increase the flux in coil 2 and correspondingly decrease the flux in coil 1 so that the two E. M. F.'s induced will be opposed and presumably equal. Similarly the two E. M. F.'s induced in coils 3 and 4 will be opposed and presumably equal so that the net effect will be zero. For any other direction of vibration there will at least be an effect equal to the difference between the horizontal and vertical components and, as already pointed out, for any vibration within 45° of the direction indicated by the arrow the effect of the two components will be added rather than subtracted.

If desired an arrow may be placed on the cap of the instrument to correspond to the arrow on the diagram indicating the quadrant of its greatest sensitivity. In practice then this arrow should preferably be pointed in the known or assumed direction of the source of the wave. Reflected or refracted waves which it may also be desired to detect will in all probability fall within 45° of either side of this direction.

After the device has been used to pick up the desired waves at a particular location the instrument may be pulled out of the ground. To aid in this operation the upper end of the cone is provided with a pair of ears 43 and 44 each of which is provided with an eye bolt 45. It will be found that due to the intimate contact of the cone with the earth considerable pulling will be required to remove the instrument. The turning of the cone by forcing against one or both of the ears will aid in loosening it or a crow bar may be inserted below one of the ears to pry it up. When once loosened the instrument may be readily raised by means of the eye bolts.

If the device is to be used for the reception of sound or similar waves through water it is merely necessary to suspend the instrument by means of the eye bolts in such a way as to completely immerse the device. The instrument is entirely water-proof so that there is no danger of affecting the operation in any detrimental way.

While the preferred mode of using the present invention has been described in detail in the foregoing sections there are numerous possibilities for modification of various features for the accomplishment of somewhat different results. For example, it is possible to so connect the coils, of the device already disclosed, with suitable transformers that not only the amplitude but the direction of a source of sound or similar waves may be determined. In order to accomplish this result it is merely necessary to appropriately combine the effects produced in coils 1 and 4 and simultaneously combine the effects produced in coils 2 and 3. By then producing separate indications as to the magnitude of the effects upon two groups of coils it is possible to determine the direction of the source. For this purpose each coil is preferably connected in series with the primary coil of a separate transformer and with a D. C. source of electricity; the latter may if desired, as shown in Figure 4, be common to all of the circuits through the transformers and coils. Thus the coil 4 may have one of its terminals connected to one end of the primary coil of a transformer 4', while the other end of this primary may be connected to the positive terminal of a battery 46. The negative terminal of the battery may then be connected to the other terminal of the coil 4. Similarly the the remaining coils 3, 1 and 2 of the armature may be connected in series with the primary coils of transformers 3', 1' and 2', respectively, in the manner shown, care being taken to pass the current through the several coils in such direction as to establish the polarity indicated.

With this hook-up of coils and transformers it will be apparent that the movement of the armature cross in the direction of the arrow, indicated in Figure 4, will increase the flux through coils 3 and 4 so that currents will be induced therein to oppose this increase. A change in the current through the transformers 3' and 4' will therefore take place in the direction indicated by the arrows adjacent the primary coils of these transformers. In the other hand, the flux passing through coils 1 and 2 will be decreased so that an E. M. F. aiding that from the source 46 will be induced in each of these to oppose the decrease in flux and a change in current passing through the primary windings of the transformers 1' and 2' in the direction indicated by the arrows adjacent these windings will be brought about. The changes in current in all of the primary windings of the transformer will induce corresponding currents in the secondary windings of these transformers, as indicated by the arrows adjacent these windings. Now by appropriately connecting the coils 1' and 4' in series in such a way as to add the two induced currents flowing through them, a galvanometer 47 placed in the circuit may be made to give an indication in proportion to the change of flux through the coils 1 and 4. Similarly the secondary windings of transformers 2' and 3' may be connected in series so that their combined induced currents may be detected by a galvanometer 48 whose reading will be proportional to the change of flux through the coils 2 and 3. The readings of the two galvanometers 47 and 48, therefore, will serve to indicate the components of the vibration in the two directions along the co-ordinate axes formed by the center lines of the arms of the armature cross. Knowing these components it is obvious that the precise direction of the source of vibration may readily be determined. It is assumed, of course, that as between two directions 180° apart the general direction of the source will be known.

In all of the preceding sections it has been assumed that the device is to be employed for the detection of vibrations arriving at the instrument from a substantially horizontal direction or the horizontal components of vibrations from any other direction. Figures 5 and 6 illustrate a modification whereby the device may be better suited for the detection of vertical components of a vibration. As shown the armature cross 49 instead of being inserted in the circular area formed within the laminated annular ring 50 may be placed in the plane above this ring. The arms of the cross will then be extended to cover at least a portion of the upper adjacent surface of the laminated ring. Preferably the arms will not extend to the outer periphery of the ring but will be cut off so as to leave a small rim of the ring entirely free for engagement by a clamping element, similar to ring 25 of Figure 1, to hold the laminations in place. A rod, similar to rod 14 of Figure 1, may be employed for supporting the armature but it will preferably be of less diameter so that it will yield to a certain extent under the weight of the armature. In place of this construction, a horizontally disposed leaf spring may be employed for supporting the armature. A slight clearance of about .006 of an inch will preferably be maintained between the arms of the cross and the upper surface of the laminated ring 50. Now as a vibration reaches the instrument from a direction directly below the latter it will cause an upward movement of the casing carrying with it the ring 50 but due to the inertia of the armature 49 the latter will remain substantially stationary and cause a slightly greater buckling of the supporting rod. It will be obvious that the relative movement thus produced will tend to increase the flux through all of the coils mounted on the armature cross.

Figure 11:
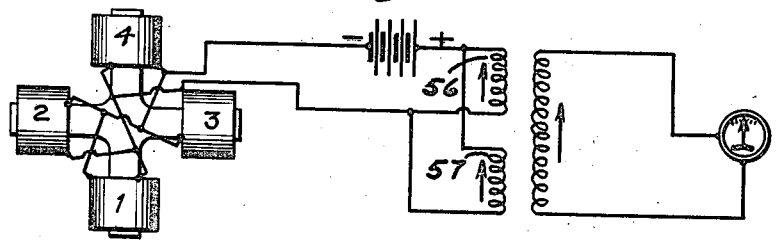

Figures 9, 10 and 11 illustrate suitable forms of connection between the coils and windings of a transformer for detecting these vibrations. In Figure 9 substantially the same hook-up of coils as illustrated in Figure 3 is adopted so that the coils will be united in the pairs 1, 2 and 3, 4 which will separately affect the current flowing in the primary windings 51 and 52, respectively, of the transformer. Since the upward movement of the conical casing will in this instance increase the flux passing through all of the coils a change in current will be effected in the windings 51 and 52 in the direction indicated by the arrows due to the induced currents in all of the coils opposing that from the D. C. source indicated. The induced current in the secondary coil 53 of the transformer will be of the combined magnitude of the changes in windings 51 and 52 and may be made to effect a visible indication by means of the galvanometer 54.

In the arrangement illustrated in Figure 10 the coils are all connected in series with each other and are in series with both of the primary windings of the transformer 55. It will be obvious that an upward movement of the conical casing relative to the armature cross with its consequent increase in flux through all of the coils will produce a change in current through the transformer opposing that from the D. C. source, as indicated by the arrows. This change may then be indicated in any suitable way by a means in the circuit of the secondary winding of the transformer. This series arrangement of the coils will, of course, result in a relatively high impedance in the circuit and if this is found to be undesirable a parallel connection of the coils, as illustrated in Figure 11, may be adopted. When the parallel connection of all four of the coils is employed it will be preferable, as shown, to connect the windings 56 and 57 of the transformer in parallel, although they may be connected in series as in Figure 10 if desired. Simultaneous increase in the flux through all of the coils upon receipt of the vibration vertically from below will set up changes in the windings 56 and 57, as indicated by the arrows, and these will induce a current in the secondary in proportion to the combined changes.

While the two forms of construction of the device, with respect to the mounting of the armature and the laminated ring, previously discussed, will permit of detecting vibrations to a certain extent in both the vertical and horizontal directions, each form is particularly suited for only one of these types of vibration and is not very well suited for detecting vibrations of the other type. Figures 7 and 8 illustrate a further modification whereby the device may be rendered equally suited to the detection of horizontal and vertical vibrations. In this form of the invention the cooperating faces of the armature 58 and of the annular laminated ring 59 are formed at an angle of 45° and the armature and ring may then be located in the same plane, as indicated in Figure 7, with a portion of the arms of the cross overlapping a portion of the laminated ring. As in the case of the form shown in Figures 5 and 6 the supporting rod, similar to 14 of Figure 1, will preferably be of less diameter and will yield slightly to the weight of the armature.

Vibrations received from directly below the device will then cause the casing, together with the ring 59, to rise slightly while the armature 58, due to its inertia, will remain substantially stationary so that the air gap will be reduced and the flux passing through all of the coils will be increased. On the other hand, if the vibration is received from a horizontal direction the cross will rock toward one side or the other and thereby decrease the air gap between one or more of the poles and the ring 59 and increase the air gap between one or more of the remaining poles and the annular ring.

Figure 12:
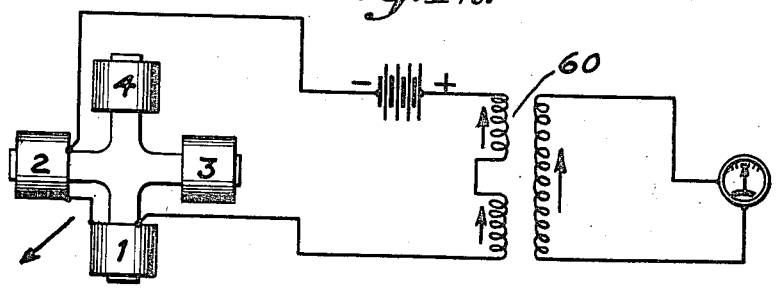
Figure 12 illustrates suitable connections for detecting both horizontal and vertical components by means of the construction shown in Figures 7 and 8.

Figure 12 illustrates one particular arrangement of circuits for detecting the vibrations received in either vertical or horizontal directions; it will, of course, also be affected by the two components of vibrations coming from any direction. For this purpose only two of the coils say, for example, 1 and 2, will be directly employed and the remaining coils 3 and 4 will be present only for the purpose of balancing the armature cross. The connection is such that the two coils are in series with each other and with a D. C. source of electricity as well as the two primary windings of the transformer 60. Obviously any vertical, upward movement of the casing with respect to the armature will increase the flux in both coils. Similarly a vibration received in a horizontal direction, such as indicated by the arrow in Figure 12, will serve to reduce the air gap and will, therefore, increase the flux in both coils. A change in the current in the primary windings of the transformer 60, as indicated by the arrow, will, therefore, result and a corresponding current will be induced in the secondary and may be indicated by any suitable means.

In connection with all forms of the invention, as hereinabove described, it is highly desirable to attain as nearly as possible the condition in which the casing and all of the parts which move directly therewith, form a mass not only having an average density equal to that of the displaced soil but one whose center of gravity is the same as that of the soil displaced. It will be apparent that the more nearly this condition is approached the more accurately the vibrations of the surrounding earth will be reproduced. Furthermore, it is desirable that the average density for each increment of length shall be substantially the same. Thus, for example, it is preferable, although it is practically impossible to carry it out precisely, to have the center of gravity of each horizontal section of the device of say an inch in height in coincidence with the center of gravity of the soil which occupied the same space. Adherence as closely as possible to this condition will avoid much of the distortion in the vibrations of the casing which would otherwise result.

While several admirable forms or embodiments of the present invention have been disclosed in detail in the foregoing sections, it will be understood that many other changes may be made within the contemplation of the invention and which will fall within the scope of the claims which follow.

The invention herein described may be manufactured and used by or for the Government of the United States for governmental purposes without the payment to me of any royalty thereon or therefor.

What I claim is:

1. In a vibration detector an annular ring of magnetic material, an armature in the form of a cross fitted within said ring, means for supporting said ring and armature and adapted to permit relative movement therebetween a coil mounted on each arm of said cross, said coils being connected in pairs in series and the pairs of coils being connected in parallel with a D. C. source, and means for detecting the combined variations in flux through said coils upon relative movements of the ring and armature.

2. In a vibration detector a plurality of magnetic poles, a magnetic conductor adjacent said poles and bodily movable relative thereto to vary the flux, a plurality of coils located in said fields of variable flux, and means electrically connecting said coils, certain of said magnets being arranged at substantially right angles and certain of said coils being connected in series so that a vibration of given amplitude will induce substantially the same combined current in said coils regardless of the direction of reception within a range of 90°.

3. In a vibration detector a casing, an element of magnetic material within said casing, a multi-armed member mounted adjacent said element with the ends of its arms in close proximity to said element, said element and member being carried by said casing but adapted for relative bodily movement, coils mounted on said arms, a source of electricity, and means for connecting said coils, certain of said coils in groups being connected in series, and said groups being connected in parallel with said source.

4. In a vibration detector a casing, an element of magnetic material within said casing, a multi-armed member mounted adjacent said element with the ends of its arms in close proximity to said element, said element and member being carried by said casing but adapted for relative bodily movement, coils mounted on said arms, a source of electricity, means for connecting said coils, certain of said coils in groups being connected in series, and said groups being connected in parallel with said source, a transformer, means for connecting said groups of coils with separate primary windings of said transformer in proper sense to produce normal current flow in opposite directions, and means for indicating variations in current flow through the secondary winding of said transformer due to relative movement between said member and element.

5. In a vibration detector an elongated casing, a plurality of magnets arranged at right angles to each other, a magnetic conductor supported by said casing and spaced slightly from a pole of each of said magnets, means for supporting said magnets from said casing so as to permit relative movement between said magnets and said conductor in any direction in a plane, a plurality of coils one in the field of each of said magnets, said coils being connected in parallel with a D. C. source, and means for detecting the combined variations in flux through said coils upon relative movements of the conductor and magnets.

6. In a vibration detector a substantially hollow conical casing, a resilient rod extending throughout the length of said casing and coinciding with the longitudinal axis of said casing, the lower end of said rod being secured to the apex of said casing, an armature mounted on the upper end of said rod and within said casing, coils mounted on said armature and adapted to receive a direct current of electricity to establish a magnetic field, and means carried by the upper end of said casing for creating variations in flux through said coils by the relative movement of said casing and armature.

HARVEY C. HAYES.